United States Patent
Dudar

(10) Patent No.: US 9,856,828 B2
(45) Date of Patent: Jan. 2, 2018

(54) FUEL VAPOR PURGING DIAGNOSTICS FOR A MULTI-PATH PURGE EJECTOR SYSTEM

(71) Applicant: Ford Global Technologies, LLC, Dearborn, MI (US)

(72) Inventor: Aed M. Dudar, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/143,185

(22) Filed: Apr. 29, 2016

(65) Prior Publication Data

US 2017/0314512 A1   Nov. 2, 2017

(51) Int. Cl.
*F02D 41/22* (2006.01)
*F02M 25/08* (2006.01)
*F02B 37/00* (2006.01)
*F02D 33/00* (2006.01)

(52) U.S. Cl.
CPC ......... *F02M 25/0827* (2013.01); *F02B 37/00* (2013.01); *F02D 33/006* (2013.01); *F02M 25/0836* (2013.01)

(58) Field of Classification Search
CPC .......... F02M 25/0827; F02M 25/0836; F02M 25/0809; F02B 37/00; F02D 33/006; F02D 2041/224; F02D 2041/225; F02D 41/221; F02D 41/222

USPC .............. 123/520; 701/107; 73/114.39
See application file for complete search history.

(56) References Cited

U.S. PATENT DOCUMENTS

| | | | | |
|---|---|---|---|---|
| 5,251,477 A | * | 10/1993 | Nakashima | F02M 25/0809 73/114.39 |
| 5,284,050 A | * | 2/1994 | Iida | F02M 25/0809 73/114.39 |
| 7,810,475 B2 | | 10/2010 | Peters et al. | |
| 9,133,796 B2 | | 9/2015 | Plymale et al. | |
| 9,416,755 B2 | * | 8/2016 | Dudar | F02M 25/0809 |
| 2013/0220282 A1 | | 8/2013 | Hadre et al. | |
| 2017/0058799 A1 | * | 3/2017 | Dudar | F02D 41/0032 |

* cited by examiner

*Primary Examiner* — Hai Huynh
(74) *Attorney, Agent, or Firm* — James Dottavio; McCoy Russell LLP

(57) ABSTRACT

Methods and systems are provided for adjusting and diagnosing one or more canister purge valves in a fuel vapor recovery system. In one example, a method may include adjusting one or more canister purge valves in a passage coupled to a fuel vapor canister of the fuel vapor recovery system to allow flow between an intake passage and an intake manifold of the engine based on engine operating conditions. Further, the method may include indicating the one or more canister purge valves are degraded and based on a change in air-fuel ratio after adjusting the one or more canister purge valves.

20 Claims, 8 Drawing Sheets

FUEL VAPOR PURGING DIAGNOSTICS FOR A MULTI-PATH PURGE EJECTOR SYSTEM

FIELD

The present description relates generally to methods and systems for controlling flow and diagnosing components in a fuel vapor recovery system for a vehicle with a boosted internal combustion engine.

BACKGROUND/SUMMARY

Vehicles may be fitted with evaporative emission control systems such as onboard fuel vapor recovery systems. Such systems capture and reduce release of vaporized hydrocarbons to the atmosphere, for example fuel vapors released from a vehicle gasoline tank during refueling. Specifically, the vaporized hydrocarbons (HCs) are stored in a fuel vapor canister packed with an adsorbent which adsorbs and stores the vapors. At a later time, when the engine is in operation, the evaporative emission control system allows the vapors to be purged into the engine intake manifold for use as fuel. The fuel vapor recovery system may include one more check valves, ejectors, and/or controller actuatable valves for facilitating purge of stored vapors under boosted or non-boosted engine operation.

Various approaches have been developed for detecting fuel vapor leaks and/or degraded components in such fuel vapor recovery systems. However, the inventors have recognized several potential issues with such methods. The inventors have recognized that, in particular, it may be difficult to diagnose one or more valves controlling flow of purge gases from the fuel vapor canister to the intake passage upstream of the compressor (e.g., during non-boosted conditions). For example, it may be difficult to determine if a check valve positioned downstream of a compressor purge valve and upstream of an ejector and intake passage, upstream of the compressor, is stuck in an open position. If this check valve is stuck in an open position, during natural aspiration (e.g., non-boosted) operation, intake air through the open path may be sucked into the engine. This unmetered air may cause the air-fuel ratio to decrease (and become leaner than desired), thereby increasing NOx emissions. Specifically, the inventors have recognized that it may be difficult to diagnose a position of this check valve during regular boosted or non-boosted (e.g., vacuum) modes without the aid of additional sensors. However, adding sensors for this diagnosis may increase engine costs and complicate engine control.

In one example, the issues described above may be addressed by a method for adjusting one or more canister purge valves arranged in a flow passage coupled to a fuel vapor canister, an intake manifold, and an intake passage upstream of a compressor, to allow flow through the flow passage between the intake passage and intake manifold and not to the canister; and indicating the one or more canister purge valves are degraded based on a change in air-fuel ratio following the adjusting. In this way, a position of the one or more canister purge valves may be diagnosed and undesired airflow from the intake passage to intake manifold which may result in unrequested enleanment may be detected, thereby increasing engine air-fuel control and increasing engine efficiency.

As one example, the one or more canister purge valves may be a single, three-way canister purge valve arranged at a junction between a first passage coupled to the canister, a second passage coupled to the intake manifold, and a third passage coupled to the intake passage. A controller may actuate the three-way canister purge valve to move into a first position that is open to the intake passage and intake manifold and closed to the canister. As a result, intake air may be allowed to flow from the intake passage to the intake manifold. However, if the canister purge valve is degraded (e.g., doesn't move when commanded) or is stuck in a position that is open to the intake manifold and intake passage, intake air may have been flowing into the intake manifold from the intake passage via the canister purge valve both before and after the command to move the valve into the first position (and thus the air-fuel ratio may not change after commanding the valve into the first position). Thus, by monitoring a change in air-fuel ratio after commanding the canister purge valve into the first position, the controller may determine whether the canister purge valve is in the commanded position or not. This may allow the controller to diagnose a position or functioning of the canister purge valve without the use of additional sensors or control routines, thereby decreasing engine costs and control complexity. Additionally, by diagnosing a stuck or degraded canister purge valve, undesired lean engine operation may be detected and the controller may take corrective action to reduce a degradation in engine performance resulting in the lean air-fuel ratio. For example, the controller may increase fuel injection to compensate for the excess air flowing to the intake manifold via the canister purge valve. In this way, engine control may be increased and engine output may be maintained at a requested level.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
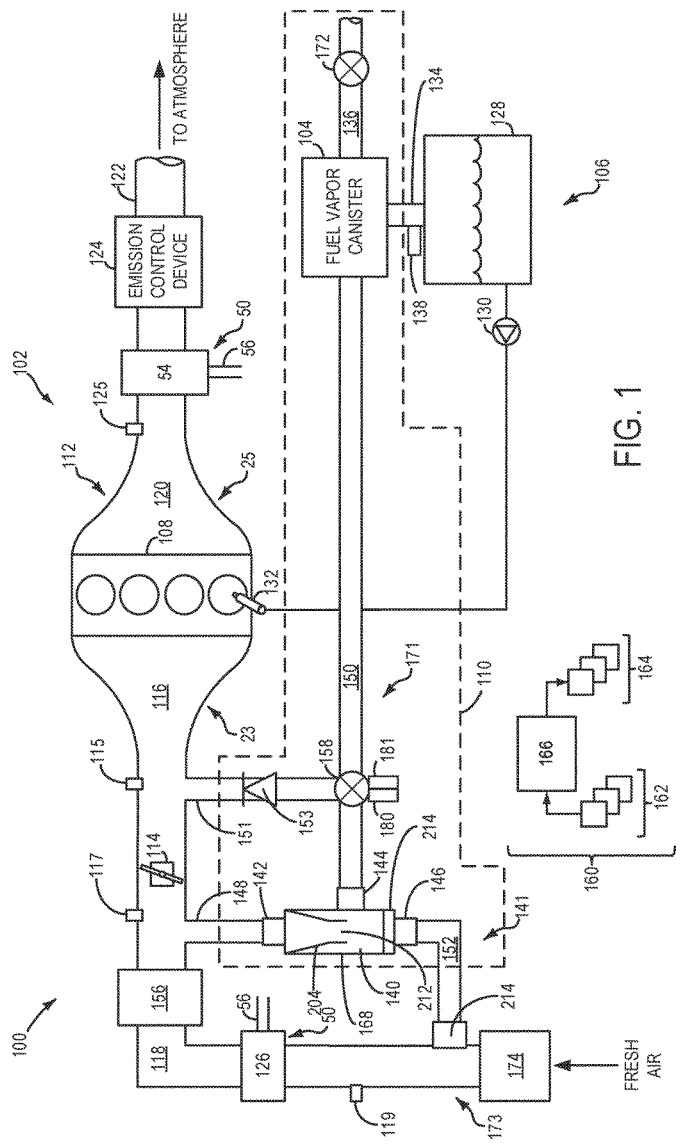
FIG. 1 shows a schematic diagram of a first embodiment of a multi-path fuel vapor recovery system of a vehicle system.
Figure 2:
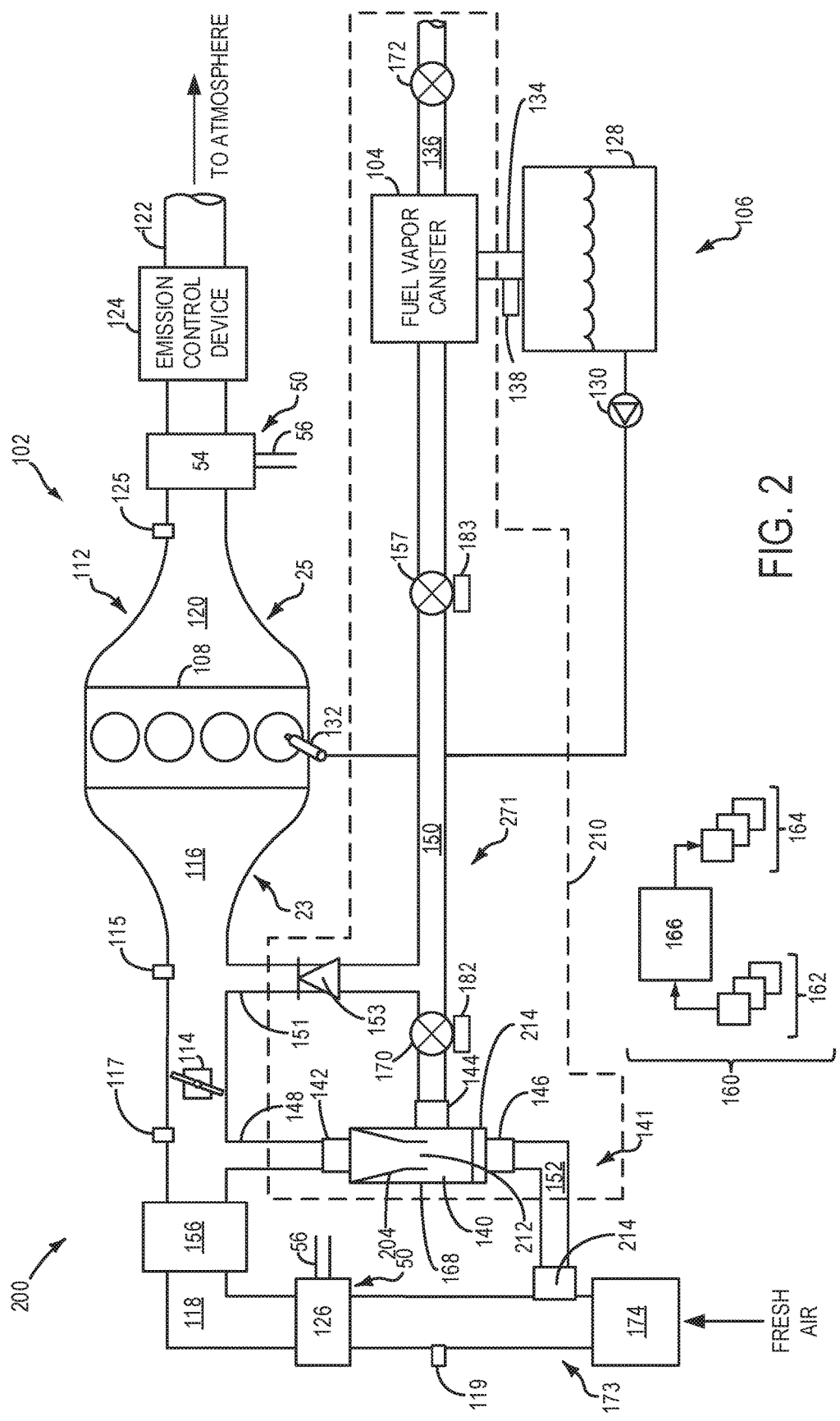
FIG. 2 shows a schematic diagram of a second embodiment of a multi-path fuel vapor recovery system of the vehicle system.
Figure 3:
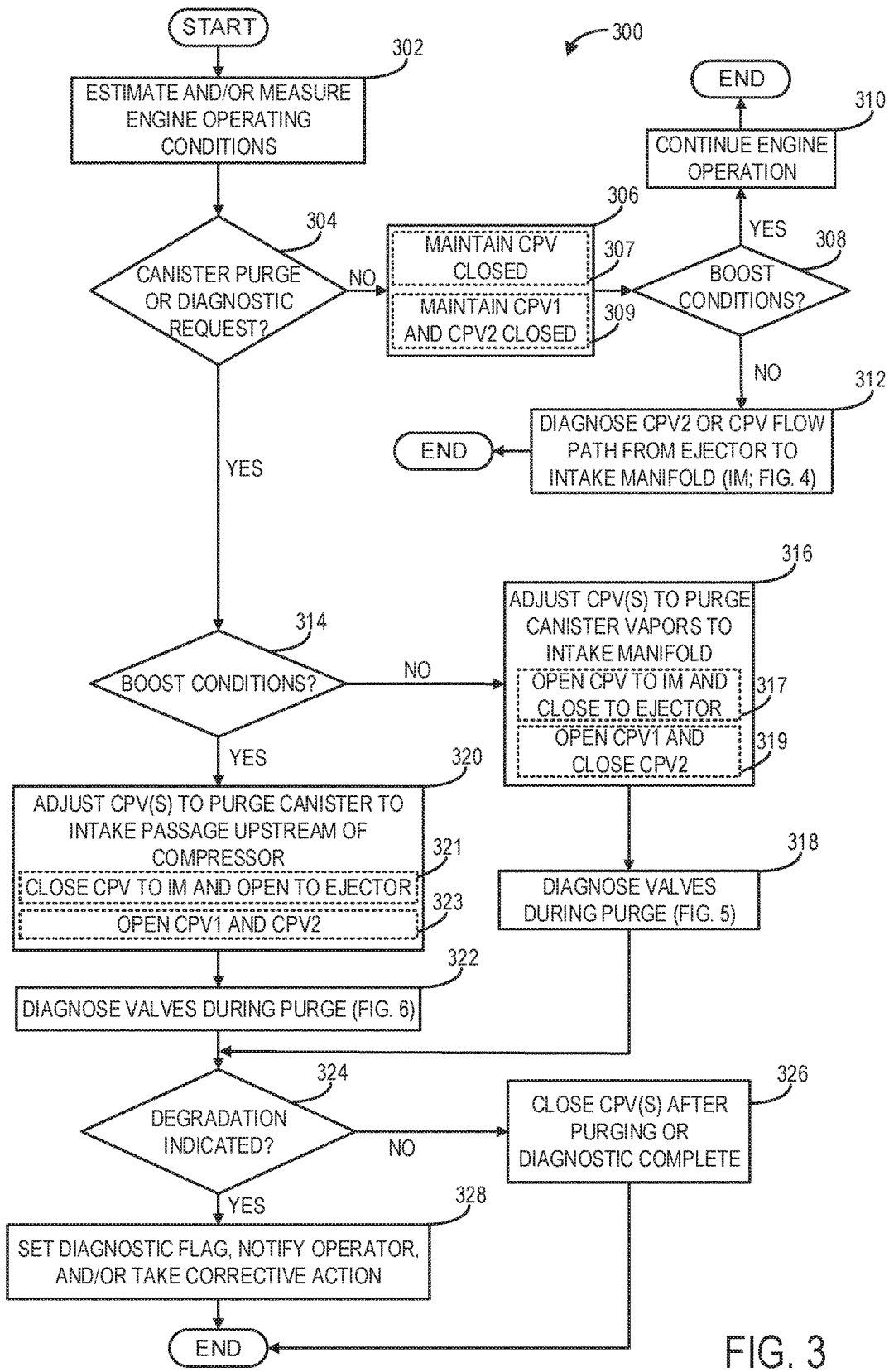
FIG. 3 shows a flow chart of a method for purging fuel vapors from a fuel vapor recovery system and diagnosing one or more canister purge valves in the fuel vapor recovery system.
Figure 4:
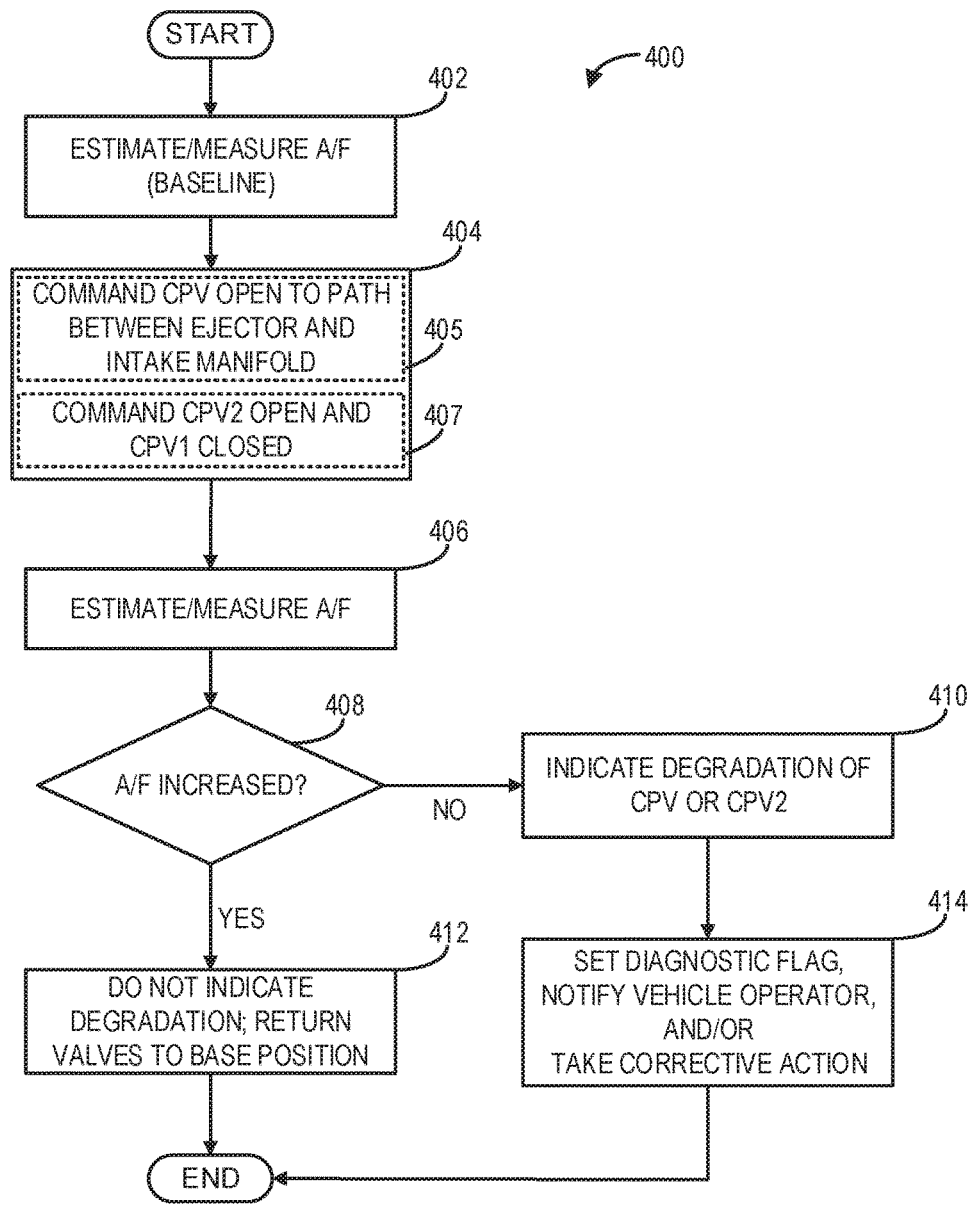
FIG. 4 shows a flow chart of a method for diagnosing the one or more canister purge valves in a flow path from an intake passage to an intake manifold.
Figure 5:
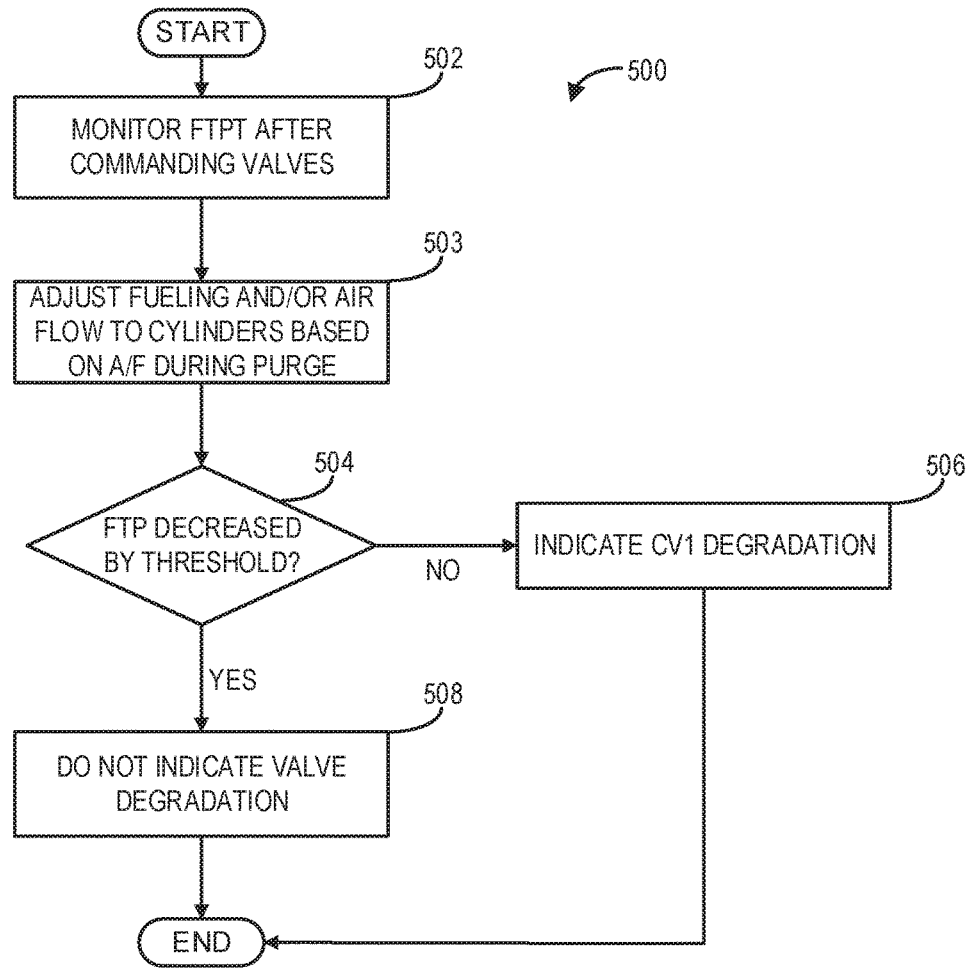
FIG. 5 shows a flow chart of a method for diagnosing the one or more canister purge valves in a flow path from a fuel vapor canister to the intake manifold.
Figure 6:
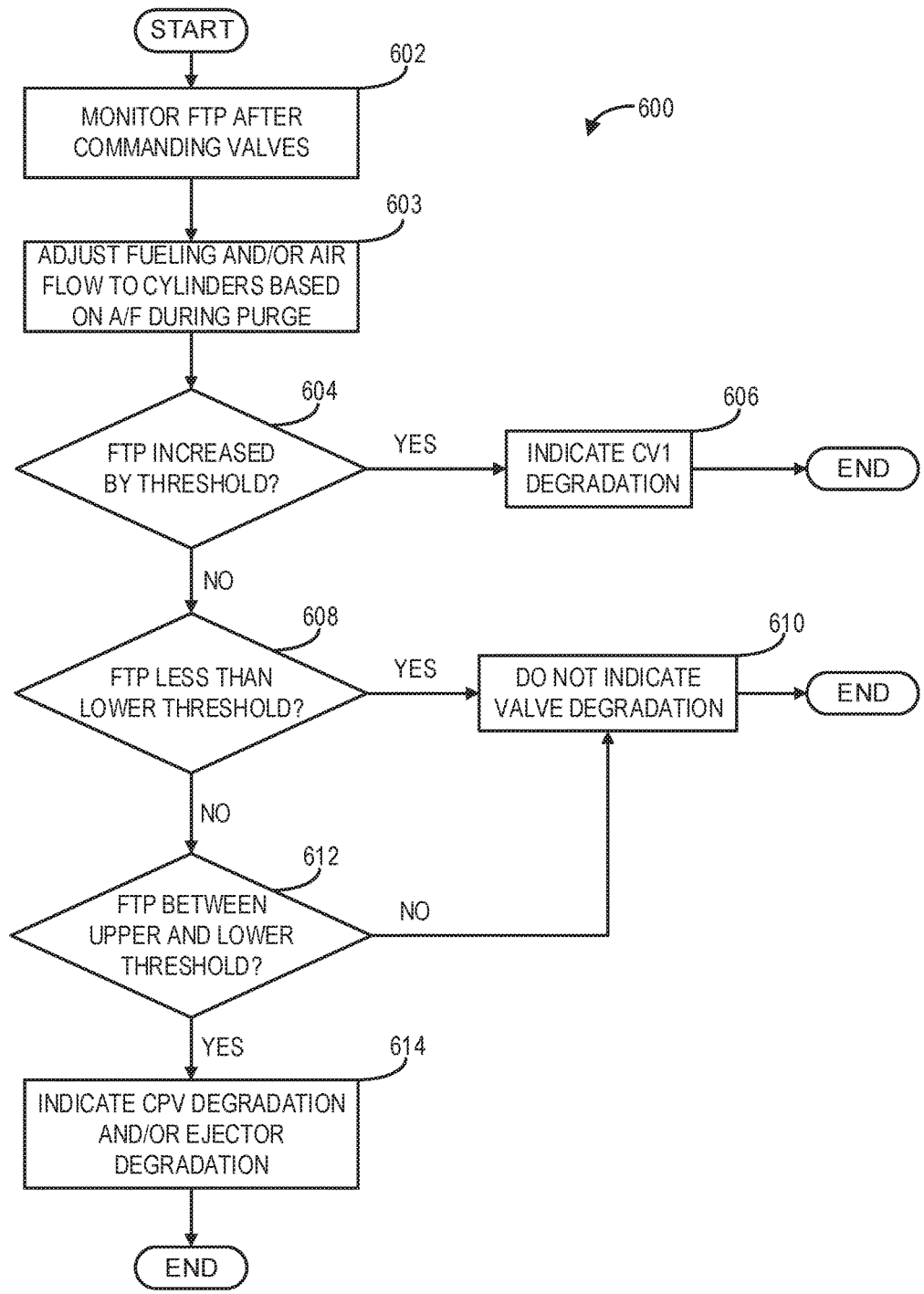
FIG. 6 shows a flow chart of a method for diagnosing the one or more canister purge valve in a flow path from the fuel vapor canister to the intake passage.

The following description relates to systems and methods for adjusting and diagnosing one or more canister purge valves in a fuel vapor recovery system of a vehicle system. A schematic depiction of an example vehicle system, including a fuel vapor recovery system, is shown in FIG. 1. The fuel vapor recovery system shown in FIG. 1 has a single, three-way canister purge valve arranged at a junction between a passage to an intake manifold, a passage to a fuel vapor canister, and a passage to an intake passage. Substantially the same vehicle system shown in FIG. 1 is depicted in FIG. 2 with the exception that two canister purge valves are used instead of a three-way canister purge valve in the fuel vapor recovery system. During engine operation, the one or more canister purge valves may become degraded and/or stuck in an unrequested position. Some positions of the canister purge valve(s) may be diagnosed during canister purging operation, while other positions may be diagnosed separate from purging operations. FIGS. 3-6 illustrate example methods for canister purging and diagnosing the one or more canister purge valves under boosted or non-boosted modes. Specifically, FIG. 3 shows a method for determining when to purge and/or diagnose the different positions of the one or more canister purge valves. FIG. 4 shows a method for diagnosing the one or more canister purge valves in a flow path from an intake passage to an intake manifold when canister purging is not requested. FIG. 5 shows a method for diagnosing the one or more canister purge valves in a flow path from a fuel vapor canister to the intake manifold when the engine is not boosted. Additionally, FIG. 6 shows a method for diagnosing the one or more canister purge valves in a flow path from the fuel vapor canister to the intake passage when the engine is boosted. Finally, FIGS. 7-8 graphically depict changes to various engine operating parameters in response to canister purging and/or diagnosing the one or more canister purge valves. In this way, a condition (e.g., degradation) of the one or more canister purge valves may be diagnosed and corrective action may be taken in order to increase engine control and efficiency during the degraded valve conditions.

Turning to the figures, FIG. 1 shows a schematic depiction of a vehicle system 100. The vehicle system 100 includes an engine system 102 coupled to a fuel vapor recovery system 110 and a fuel system 106. The fuel vapor recovery system may also be referred to as a fuel vapor purging system. The engine system 102 may include an engine 112 having a plurality of cylinders 108. The engine 112 includes an engine intake 23 and an engine exhaust 25. The engine intake 23 includes a throttle 114 fluidly coupled to the engine intake manifold 116 via an intake passage 118. An air filter 174 is positioned upstream of throttle 114 in intake passage 118. The engine exhaust 25 includes an exhaust manifold 120 leading to an exhaust passage 122 that routes exhaust gas to the atmosphere. The engine exhaust 122 may include one or more emission control devices 124, which may be mounted in a close-coupled position in the exhaust. One or more emission control devices may include a three-way catalyst, lean NOx trap, diesel particulate filter, oxidation catalyst, etc. It will be appreciated that other components may be included in the vehicle system, such as a variety of valves and sensors, as further elaborated below.

Throttle 114 may be located in intake passage 118 downstream of a compressor 126 of a boosting device, such as turbocharger 50, or a supercharger. Compressor 126 of turbocharger 50 may be arranged between air filter 174 and throttle 114 in intake passage 118. Compressor 126 may be at least partially powered by exhaust turbine 54, arranged between exhaust manifold 120 and emission control device 124 in exhaust passage 122. Compressor 126 may be coupled to exhaust turbine 54 via shaft 56. Compressor 126 may be configured to draw in intake air at atmospheric air pressure into an air induction system (AIS) 173 and boost it to a higher pressure (e.g., higher than atmospheric pressure). Using the boosted intake air, a boosted engine operation may be performed.

An amount of boost may be controlled, at least in part, by controlling an amount of exhaust gas directed through exhaust turbine 54. In one example, when a larger amount of boost is requested, a larger amount of exhaust gases may be directed through the turbine. Alternatively, for example when a smaller amount of boost is requested, some or all of the exhaust gas may bypass turbine via a turbine bypass passage as controlled by wastegate (not shown). An amount of boost may additionally or optionally be controlled by controlling an amount of intake air directed through compressor 126. Controller 166 may adjust an amount of intake air that is drawn through compressor 126 by adjusting the position of a compressor bypass valve (not shown). In one example, when a larger amount of boost is requested, a smaller amount of intake air may be directed through the compressor bypass passage.

Fuel system 106 may include a fuel tank 128 coupled to a fuel pump system 130. The fuel pump system 130 may include one or more pumps for pressurizing fuel delivered to fuel injectors 132 of engine 112. While only a single fuel injector 132 is shown, additional injectors may be provided for each cylinder. For example, engine 112 may be a direct injection gasoline engine and additional injectors may be provided for each cylinder. It will be appreciated that fuel system 106 may be a return-less fuel system, a return fuel system, or various other types of fuel system. In some examples, a fuel pump may be configured to draw the tank's liquid from the tank bottom. Vapors generated in fuel system 106 may be routed to fuel vapor recovery system 110, described further below, via conduit 134, before being purged to the engine intake 23.

Fuel vapor recovery system 110 includes a fuel vapor retaining device, depicted herein as fuel vapor canister 104. Canister 104 may be filled with an adsorbent capable of binding large quantities of vaporized HCs. In one example, the adsorbent used is activated charcoal. Canister 104 may receive fuel vapors from fuel tank 128 through conduit 134. While the depicted example shows a single canister, it will be appreciated that in alternate embodiments, a plurality of such canisters may be connected together. Canister 104 may communicate with the atmosphere through vent 136. In some examples, a canister vent valve 172 may be located along vent 136, coupled between the fuel vapor canister and the atmosphere, and may adjust a flow of air and vapors between canister 104 and the atmosphere. However, in other examples, a canister vent valve may not be included. In one example, operation of canister vent valve 172 may be regulated by a canister vent solenoid (not shown). For example, based on whether the canister is to be purged or not, the canister vent valve may be opened or closed. In some examples, an evaporative leak check module (ELCM) may be disposed in vent 136 and may be configured to control venting and/or assist in leak detection.

Conduit 134 may optionally include a fuel tank isolation valve (not shown). Among other functions, fuel tank isolation valve may allow the fuel vapor canister 104 to be maintained at a low pressure or vacuum without increasing the fuel evaporation rate from the tank (which would otherwise occur if the fuel tank pressure were lowered). Conduit 134 may include a fuel tank pressure transducer (FTPT) 138. Specifically, FTPT 138 may monitor the pressure in the fuel tank. The fuel tank 128 may hold a plurality of fuel blends, including fuel with a range of alcohol concentrations, such as various gasoline-ethanol blends, including E10, E85, gasoline, etc., and combinations thereof.

Fuel vapor canister 104 operates to store vaporized hydrocarbons (HCs) from fuel system 106. Under some operating conditions, such as during refueling, fuel vapors present in the fuel tank may be displaced when liquid is added to the tank. The displaced air and/or fuel vapors may be routed from the fuel tank 128 to the fuel vapor canister 104, and then to the atmosphere through vent 136. In this way, an increased amount of vaporized HCs may be stored in fuel vapor canister 104. During a later engine operation, the stored vapors may be released back into the incoming air charge via fuel vapor recovery system 110.

Fuel vapor recovery system 110 may include a dual path purge system 171. Purge system 171 is coupled to canister 104 via a conduit 150. Then, conduit 150 may be coupled to an ejector 140 in an ejector system 141, as shown in FIG. 1. Conduit 150 may include a three-way canister purge valve (CPV) 158 disposed in conduit 150. Specifically, CPV 158 may regulate the flow of vapors along duct 150. The quantity and rate of vapors released by CPV 158 may be determined by the duty cycle of an associated CPV double solenoid which includes a first solenoid 180 and a second solenoid 181. In one example, the duty cycle of the CPV solenoids may be determined by controller 166 responsive to engine operating conditions, including, for example, an air-fuel ratio. For example, the first solenoid 180 may control a first flow path between the canister 104 and the intake manifold 116 and the second solenoid 181 may control a second flow path between the canister 104 and ejector 140. In one example, when the first solenoid 180 and second solenoid 181 are both off (e.g., not activated by the controller 166), the CPV 158 is in a position that is blocked to the canister, intake manifold, and ejector. In another example, when the first solenoid 180 is activated and the second solenoid 181 is deactivated (e.g., off) the first flow path between the canister and intake manifold may be open while the second flow path between the canister and ejector is blocked. In yet another example, when the first solenoid 180 is deactivated and the second solenoid 181 is activated (e.g., on) the first flow path between the canister and intake manifold may be blocked while the second flow path between the canister and ejector is open. In another example, when both the first solenoid 180 and the second solenoid 181 are activated, both flow paths between the canister and each of the intake manifold and ejector are open. In this way, activation of the first solenoid 180 and second solenoid 181 may be controlled by the controller 166 and cause the CPV 158 to move into different positions.

By commanding the CPV to be closed to the intake manifold 116 and ejector system 141 (and thus intake passage 118, upstream of the compressor 126), the controller may seal the fuel vapor canister from the fuel vapor purging system, such that no vapors are purged via the fuel vapor purging system. In contrast, by commanding the CPV to be open to either the ejector system 141 or intake manifold 116 and the canister 104, the controller may enable the fuel vapor purging system to purge vapors from the fuel vapor canister under either boosted or non-boosted modes and/or diagnose valves, as described further below with regard to FIG. 3. During purge under non-boosted (e.g., vacuum) conditions, the three-way CPV 158 may be commanded open to the intake manifold 116 and canister 104 while closed to the intake passage 118, upstream of the compressor 126, and ejector 140 (referred to herein as flow path A-B of the CPV 158). In this position, the controller may allow purge under vacuum and diagnostics on CPV 158 may be performed to determine degradation or confirm a position of the valve. When under boost conditions (e.g., when manifold pressure in the intake manifold is greater than atmospheric pressure due to operation of the compressor 126), the three-way CPV 158 is commanded closed to the intake manifold and open to the canister and ejector (referred to herein as flow path B-C). This position allows canister purge and/or valve diagnostics under boost conditions. In a third position, CPV 158 is commanded open between the path from the ejector to the intake manifold and closed to the canister (referred to herein as flow path A-C) to diagnose the CPV 158 when canister purge has not been requested.

A conduit 151 couples conduit 150 to intake 23 at a position within conduit 150 at CPV 158 and at a position in intake 23 downstream of throttle 114. Specifically, a first end of conduit 151 is coupled directly to CPV 158 and an opposite, second end of conduit 151 is coupled directly to the intake 23 at a position downstream of throttle 114. For example, conduit 151 may be used to direct fuel from canister 104 to intake 23 using vacuum generated in intake manifold 116 during a purge event. Conduit 151 may include a check valve 153 disposed therein. Check valve (e.g., one-way check valve) 153 may prevent intake air from flowing through from intake manifold 116 into conduit 150, while allowing flow of fluid and fuel vapors from conduit 150 into intake manifold 116 via conduit 151 during a canister purging event.

Conduit 148 may be coupled to ejector 140 at a first port or inlet 142. Ejector 140 includes a second port 144 or inlet coupling ejector 104 to conduit 150 via CPV 158. Ejector 140 is coupled to intake 23 at a position upstream of throttle 114 and downstream of compressor 126 via a conduit 148. During boost conditions, conduit 148 may direct compressed air in intake conduit 118 downstream of compressor 126 into ejector 140 via port 142.

Ejector 140 may also be coupled to intake conduit 118 at a position upstream of compressor 126 via a shut-off valve 214. In one example, shut-off valve 214 is hard-mounted directly to air induction system 173 along conduit 118 at a position between air filter 174 and compressor 126. For example, shut-off valve 214 may be coupled to an existing AIS nipple or other orifice, e.g., an existing SAE male quick connect port, in AIS 173. As shown in FIG. 1, shut-off valve 214 is coupled to a third port 146 or outlet of ejector 140. Shut-off valve 214 is configured to close in response to leaks detected downstream of outlet 146 of ejector 140. As shown in FIG. 1, in some examples, a conduit or hose 152 may couple the third port 146 or outlet of ejector 140 to shut-off valve 214. In this example, if a disconnection of shut-off valve 214 with AIS 173 is detected, then shut-off valve 214 may close so air flow from the engine intake downstream of the compressor through the converging orifice in the ejector is discontinued. However, in other examples, shut-off valve 214 may be integrated with ejector 140 and directly coupled thereto. In yet other examples, the ejector system 141 may not include shut-off valve 214. In an alternate embodiment, the fuel vapor recovery system may not include an ejector and the CPV 158 may be directly coupled to the intake passage, upstream of compressor 126, via a conduit only.

Ejector 140 includes a housing 168 coupled to ports 146, 144, and 142. In one example, only the three ports 146, 144, and 142 are included in ejector 140. Ejector 140 may include various check valves disposed therein. For example, in some examples, ejector 140 may include a check valve positioned adjacent to each port in ejector 140 so that unidirectional flow of fluid or air is present at each port. For example, air from intake conduit 118 downstream of compressor 126 may be directed into ejector 140 via inlet port 142 and may flow through the ejector and exit the ejector at outlet port 146 before being directed into intake conduit 118 at a position upstream of compressor 126. This flow of air through the ejector may create a vacuum due to the Venturi effect at inlet port 144 so that vacuum is provided to conduit 150 via port 144 during boosted operating conditions. In particular, a low pressure region is created adjacent to inlet port 144 which may be used to draw purge vapors from the canister into ejector 140.

Ejector 140 includes a nozzle 204 comprising an orifice which converges in a direction from inlet 142 toward suction inlet 144 so that when air flows through ejector 140 in a direction from port 142 towards port 146, a vacuum is created at port 144 due to the Venturi effect. This vacuum may be used to assist in fuel vapor purging during certain conditions, e.g., during boosted engine conditions. In one example, ejector 140 is a passive component. That is, ejector 140 is designed to provide vacuum to the fuel vapor purge system via conduit 150 to assist in purging under various conditions, without being actively controlled. Thus, whereas CPV 158 and throttle 114 may be controlled via controller 166, for example, ejector 140 may be neither controlled via controller 166 nor subject to any other active control. In another example, the ejector may be actively controlled with a variable geometry to adjust an amount of vacuum provided by the ejector to the fuel vapor recovery system via conduit 150.

During select engine and/or vehicle operating conditions, such as after an emission control device light-off temperature has been attained (e.g., a threshold temperature reached after warming up from ambient temperature) and with the engine running, the controller 166 may adjust the duty cycle of a canister vent valve solenoid (not shown) and open or maintain open canister vent valve 172. For example, canister vent valve 172 may remain open except during vacuum tests performed on the system. At the same time, controller 166 may adjust the duty cycle of the CPV solenoids 180 and 181 and open CPV 158. Pressures within fuel vapor purging system 110 may then draw fresh air through vent 136, fuel vapor canister 104, and CPV 158 such that fuel vapors flow into conduit 150.

The operation of ejector 140 within fuel vapor purging system 110 during vacuum conditions will now be described. The vacuum conditions may include intake manifold vacuum conditions. For example, intake manifold vacuum conditions may be present during an engine idle condition, with manifold pressure below atmospheric pressure by a threshold amount. This vacuum in the intake system 23 may draw fuel vapor from the canister through conduits 150 and 151 into intake manifold 116. Further, at least a portion of the fuel vapors may flow from conduit 150 into ejector 140 via port 144. Upon entering the ejector via port 144, the fuel vapors may flow through nozzle 204 from toward port 142. Specifically, the intake manifold vacuum causes the fuel vapors to flow through orifice 212. Because the diameter of the area within the nozzle gradually increases in a direction from port 144 towards port 142, the fuel vapors flowing through the nozzle in this direction diffuse, which raises the pressure of the fuel vapors. After passing through the nozzle, the fuel vapors exit ejector 140 through first port 142 and flow through duct 148 to intake passage 118 and then to intake manifold 116.

Next, the operation of ejector 140 within fuel vapor purging system 110 during boost conditions will be described. The boost conditions may include conditions during which the compressor is in operation. For example, the boost conditions may include one or more of a high engine load condition and a super-atmospheric intake condition, with intake manifold pressure greater than atmospheric pressure by a threshold amount.

Fresh air enters intake passage 118 at air filter 174. During boost conditions, compressor 126 pressurizes the air in intake passage 118, such that intake manifold pressure is positive. Pressure in intake passage 118 upstream of compressor 126 is lower than intake manifold pressure during operation of compressor 126, and this pressure differential induces a flow of fluid from intake conduit 118 through duct 148 and into ejector 140 via ejector inlet 142. This fluid may include a mixture of air and fuel, for example. After the fluid flows into the ejector via the port 142, it flows through the converging orifice 212 in nozzle 204 in a direction from port 142 towards outlet 146. Because the diameter of the nozzle gradually decreases in a direction of this flow, a low pressure zone is created in a region of orifice 212 adjacent to suction inlet 144. The pressure in this low pressure zone may be lower than a pressure in duct 150. When present, this pressure differential provides a vacuum to conduit 150 to draw fuel vapor from canister 104. This pressure differential may further induce flow of fuel vapors from the fuel vapor canister, through the CPV, and into port 144 of ejector 140. Upon entering the ejector, the fuel vapors may be drawn along with the fluid from the intake manifold out of the ejector via outlet port 146 and into intake 118 at a position upstream of compressor 126. Operation of compressor 126 then draws the fluid and fuel vapors from ejector 140 into intake passage 118 and through the compressor. After being compressed by compressor 126, the fluid and fuel vapors flow through charge air cooler 156, for delivery to intake manifold 116 via throttle 114.

Vehicle system 100 may further include a control system 160. Control system 160 is shown receiving information from a plurality of sensors 162 (various examples of which are described herein) and sending control signals to a plurality of actuators 164 (various examples of which are described herein). As one example, sensors 162 may include an exhaust gas sensor 125 (located in exhaust manifold 120 which may be used to estimate an air-fuel ratio of the engine, in one example) and various temperature and/or pressure sensors arranged in intake system 23. For example, a pressure or airflow sensor 115 in intake conduit 118 downstream of throttle 114, a pressure or air flow sensor 117 in intake conduit 118 between compressor 126 and throttle 114, and a pressure or air flow sensor 119 in intake conduit 118 upstream of compressor 126. Other sensors such as additional pressure, temperature, air/fuel ratio, and composition sensors may be coupled to various locations in the vehicle system 100. As another example, actuators 164 may include fuel injectors 132, throttle 114, compressor 126, a fuel pump of pump system 130, etc. The control system 160 may include an electronic controller 166. The controller may receive input data from the various sensors, process the input data, and trigger the actuators in response to the processed input data based on instruction or code programmed therein corresponding to one or more routines.

The system of FIG. 1 provides for a system including an intake manifold coupled to a plurality of engine cylinders; a turbocharger including a turbine-driven compressor arranged in an intake passage upstream of the intake manifold; a fuel vapor canister coupled to a fuel tank and fuel vapor purge passage; a three-way canister purge valve arranged in the fuel vapor purge passage and fluidly coupled to each of the fuel vapor canister, the intake manifold, and the intake passage upstream of the compressor; and a controller including memory with computer readable instructions for: adjusting the three-way canister purge valve into a first position that is open to the intake manifold and intake passage and closed to the canister; and indicating degradation of the three-way canister purge valve in response to an air-fuel ratio not changing by a threshold amount following the adjusting. The system further comprising an ejector arranged between the three-way canister purge valve and the intake passage and a check valve arranged between three-way canister purge valve and the intake manifold. Additionally, the computer readable instructions may further include instructions for increasing fueling to the plurality of engine cylinders in response to the indicating.

FIG. 2 shows a schematic depiction of a vehicle system 200. The vehicle system 200 shown in FIG. 2 has similar elements to those of vehicle system 100 shown in FIG. 1. As such, in FIG. 2, like elements to FIG. 1 have been labeled with the same numbers and descriptions of like elements are not re-described below for the sake of brevity.

FIG. 2 shows a second embodiment of a fuel vapor recovery system 210 and purge system 271 which includes two canister purge valves: first canister purge valve (CPV1) 157 and second canister purge valve (CPV2) 170. Specifically, as shown in FIG. 2, conduit 150 includes CPV1 157 and CPV2 170 which are each two-way valves. The quantity and rate of vapors released by CPV1 157 and CPV2 170 may be determined by the duty cycle of associated CPV solenoids which include a first CPV solenoid 183 for actuating CPV1 157 and second CPV solenoid 182 for actuating CPV2 170. For example, when the first CPV solenoid 183 is activated by the controller 166, CPV1 157 is moved into an open position which allows flow between the canister 104 and conduit 150 (e.g., toward intake manifold 116 and/or ejector 140). When the second CPV solenoid 182 is activated by the controller 166, CPV2 170 is moved into an open position which allows flow between the conduit 150 and/or intake manifold 116 and the ejector 140 (and the intake passage 118 upstream of compressor 126).

In one example, the duty cycle of the CPV solenoids may be determined by controller 166 responsive to engine operating conditions, including, for example, an air-fuel ratio (e.g., as determined based on an output of exhaust gas sensor 125, in one example). By commanding the CPV1 157 and CPV2 170 to be closed (via deactivating the corresponding solenoids), the controller may seal the fuel vapor canister from the fuel vapor recovery system 210, such that no vapors are purged via the fuel vapor recovery system. In contrast, by commanding the CPV1 157 open (via activating the first solenoid 183), the controller 166 may enable the fuel vapor recovery system to purge vapors from the fuel vapor canister 104 to the intake manifold 116 under vacuum conditions (e.g., natural aspiration). By commanding the CPV1 157 open and CPV2 170 open, the controller 166 may enable the fuel vapor recovery system 210 to purge vapors from the canister 104 to the intake passage 118, upstream of compressor 126, under boosted conditions. Additionally, by commanding CPV1 157 open and CPV2 170 open under natural aspiration (e.g. vacuum) conditions or CPV1 open under boost conditions, the valves can be diagnosed, as described below with regard to FIG. 3.

In FIG. 3, an example method 300 is depicted for a fuel vapor recovery system, such as fuel vapor recovery systems 110 and 210 shown in FIGS. 1 and 2, respectively. In method 300, a purge system, such as purge system 171 shown in FIG. 1 or purge system 172 shown in FIG. 2, may be used during boosted or un-boosted engine operation to purge fuel vapors from a fuel vapor canister (such as fuel vapor canister 104 shown in FIGS. 1-2) into the engine intake. Further, in some examples, one or more canister purge valves (e.g., a single three-way CPV as shown in FIG. 1 or two, two-way CPVs as shown in FIG. 2) may be diagnosed during purging operations or in response to a request to run fuel vapor recovery system diagnostics Instructions for carrying out method 300 and the rest of the methods included herein may be executed by a controller (such as controller 166 shown in FIGS. 1-2) based on instructions stored on a memory of the controller and in conjunction with signals received from sensors of the engine system, such as the sensors described above with reference to FIGS. 1-2 (such as exhaust gas sensor 125 and FTPT 138). The controller may employ engine actuators of the engine system (such as fuel injector 132, throttle 114, solenoids 180, 181 and/or solenoids 182, 183 shown in FIGS. 1-2) to adjust engine operation, according to the methods described below.

The method 300 begins at 302 by estimating and/or measuring engine operating conditions. Engine operating conditions may include manifold pressure (MAP), air-fuel ratio (A/F), fuel tank pressure (e.g., pressure within a fuel tank or in a conduit coupled between a fuel tank and fuel vapor canister), engine speed and/or load, boost pressure, etc. Next, at 304, the method includes determining whether a canister purge or canister purge valve diagnostic has been requested. In one example at 304, a fuel vapor canister purge is requested. A fuel vapor purge event may be initiated in response to an amount of fuel vapor stored in the fuel vapor canister greater than a threshold amount. Further, purging may be initiated when an emission control device light-off temperature has been attained. In another example, a diagnostic routine for the one or more CPVs may be requested without a request for canister purging. For example, the controller may determine that it is time to diagnose the one or more CPVs of the fuel vapor recovery system after a duration of engine operation, after a number of engine cycles, after each engine on event, after a duration since a last valve diagnostic event, etc. It should be noted that the duration for diagnosing the CPV(s) (e.g., diagnosing a position of the valves) only and not purging fuel vapors may be shorter than a duration for diagnosing the CPV(s) during a canister purge event, as explained further below.

If a canister purge has not been requested or a diagnostic of the CPV(s) in a position that allows purging has not been requested, the method continues to 306 to maintain the CPV(s) in a close position (which may be referred to herein as a base position). In one example, as shown at 307, the method at 306 may include adjusting a three-way CPV (such as CPV 158 shown in FIG. 1 into a position that is closed to both the intake manifold and the ejector (and the intake passage, upstream of the compressor). The method at 307 may include the controller deactivating solenoids 180 and 181 to move the three-way CPV into a position that blocks flow from the fuel vapor canister to each of the intake passage and intake manifold. In another example, as shown at 309, the method at 306 may include adjusting a first CPV (referred to below as CPV1) arranged between the fuel vapor canister and a junction between the intake manifold and intake passage (such as CPV1 157 shown in FIG. 2) and a second CPV (referred to below as CPV2) arranged between the junction and an ejector (and the intake passage, upstream of the compressor, such as CPV2 170 shown in FIG. 2) into closed positions such that no air or purge vapors pass through the valves from one side of the valves to another. For example, the method at 309 may include the controller deactivating solenoids 183 and 182 to move each of the CPV1 and CPV2 into a position that blocks flow through the valves (and blocks fuel vapors from the canister from traveling outside the fuel vapor recovery system and to the intake system).

At 308, the method includes determining if the engine system is operating under boost conditions. Boost conditions may include conditions during which the compressor is in operation. For example, the boost conditions may include one or more of a high engine load condition and a super-atmospheric intake condition, with intake manifold pressure greater than atmospheric pressure by a threshold amount. Further, the controller may determine that the engine is boosted based on whether the manifold pressure in the intake manifold is greater than atmospheric pressure. If the engine is boosted, then engine operation is continued at 310 without diagnosing a position of the CPV(s). If the engine is un-boosted (e.g., manifold pressure is less than atmospheric pressure), vacuum conditions may be present and the method continues at 312. Vacuum conditions may include intake manifold vacuum conditions. For example, intake manifold vacuum conditions may be present during an engine idle condition, with manifold pressure below atmospheric pressure by a threshold amount. At 312, the method includes diagnosing a position of the three-way CPV or CPV2 flow path from the ejector (and intake passage upstream of the compressor) to the intake manifold according to the method described below with regard to FIG. 4.

Alternatively at 304, if a canister purge or canister purge valve diagnostic has been requested the method continues to 314 to determine whether the engine is under boost conditions (similar to as explained above with reference to the method at 308). When the engine is un-boosted, the CPV(s) are adjusted at 316 to purge canister fuel vapors to the intake manifold and/or diagnose the CPV(s). If a purge request has occurred, the CPV(s) may be adjusted into the position that purges fuel vapors to the intake manifold for a first duration (before adjusting the CPV(s) back to the base or closed position). Alternatively, if a request to diagnose a position of the CPV(s) has occurred without a request to purge fuel vapors, the CPV(s) may be adjusted to the position that purges fuel vapors from the canister to the intake manifold for a second duration, where the second duration is shorter than the first duration (since diagnosis only and not purging has been requested). In a first embodiment, as shown at 317, the method at 316 may include the controller adjusting the duty cycles of the CPV solenoids of the three-way CPV to adjust the three-way CPV into a position that is open to the intake manifold and closed to the ejector. After adjusting the position of the CPV for purging to the intake manifold, pressures within the fuel vapor purging system may then draw fresh air through a vent (such as vent 136 shown in FIG. 1), the fuel vapor canister, and CPV such that fuel vapors flow from the canister to the intake manifold. In a second embodiment, as shown at 319, the method at 316 may include the controller 166 adjusting the duty cycles of the CPV solenoids of CPV1 and CPV2 to adjust CPV1 into an open position and CPV2 into a closed position to allow purging of fuel vapors to the intake manifold. Once adjusted, the CPV(s) may be diagnosed during the purge (e.g., during the first duration) or for the second duration at 318, as described in more detail below with reference to FIG. 5, to determine if degradation of the CPV(s) is indicated at 324. Degradation of the CPV(s) may include a CPV that is stuck in a position different than the commanded position. In another example, degradation of the CPV(s) may include a degraded solenoid or alternate valve component.

If degradation of CPV(s) (or a component coupled with or included within the CPV(s)) is not indicated, the CPV(s) are closed (e.g., returned to their base positions) at 326 after fuel vapor canister purging and/or the CPV diagnostic is finished. For example, the three-way CPV may be adjusted into a position that blocks flow between the canister and the intake system. In another example, both CPV1 and CPV2 may be closed such that flow is blocked between the canister and the intake system (e.g., the intake passage and intake manifold). However, if CPV degradation is indicated at 324, at 328, method 300 may include setting a diagnostic flag, notifying the operator of the vehicle, and/or taking corrective action. For example, taking corrective action based on the indicated degradation may include adjusting fuel injection to the engine cylinders (e.g., such as increasing or decreasing an amount of fuel injected into the cylinders via the fuel injectors to compensate for an excess fuel vapors or air entering the engine due to the degraded CPV(s). In another example, taking corrective action may include adjusting airflow to the intake manifold via the controller actuating the throttle. In another example, the vehicle operator may be notified via a visible and/or audible signal that the CPV(s) is degraded. As such, the notification may include a notification to replace or service the indicated CPV(s).

When a canister purge or CPV diagnostic at 304 has been requested during boosted conditions, as determined at 314, the method proceeds to 320. At 320, the method includes adjusting the CPV(s) to purge fuel vapors from the fuel vapor canister under boost conditions to the intake passage, upstream of the compressor. Similarly to as explained above at 316, if a purge request has occurred, the CPV(s) may be adjusted into the position that purges fuel vapors to the intake passage for a first duration (before adjusting the CPV(s) back to the base or closed position). Alternatively, if a request to diagnose a position of the CPV(s) has occurred without a request to purge fuel vapors, the CPV(s) may be adjusted to the position that purges fuel vapors from the canister to the intake passage for a second duration, where the second duration is shorter than the first duration (since diagnosis only and not purging has been requested). In a first embodiment, as shown at 321, the method may include commanding (e.g., via the controller) the three-way CPV into a position that is closed to the intake manifold and open to the ejector (and the intake passage, upstream of the compressor). In a second embodiment, as shown at 323, the method may include commanding both CPV1 and CPV2 into an open position so that fuel vapors may flow from the canister to the intake passage under boosted conditions. The method then continues to 322 to diagnose the CPV(s) during the purge or diagnostic event, as described in more detail below with reference to FIG. 6. As explained above, if degradation is not indicated during the method of FIG. 6 and therefore at 324, the CPV(s) may be commanded closed following canister purging at 326 to block flow between the canister and intake system. However, if CPV degradation is indicated, at 328, the method may include setting a diagnostic flag, notifying the operator, and/or taking corrective action, as discussed above.

FIG. 4 illustrates the method 400 for diagnosing the one or more CPVs in the fuel recovery system when a fuel vapor purge event has not been requested and the engine is operating under normal aspiration (e.g., vacuum) conditions. Method 400 continues from the method at 312 of FIG. 3. Method 400 starts at 402 by estimating and/or measuring a baseline air-fuel ratio (referred to herein as A/F) before adjusting a position of the CPV(s) (e.g., the baseline A/F may be determined while the CPV(s) are maintained in their base or closed positions that blocks purge flow from the canister to the intake system, as described above). In one example, the method at 402 may include the controller receiving an output from an oxygen sensor (such as exhaust gas sensor 125 shown in FIGS. 1-2) and determine the baseline air-fuel ratio (e.g., exhaust or combusted air air-fuel ratio). In another example, the controller may determine the A/F based on an output of an oxygen sensor positioned in the intake manifold. In a first embodiment of the method at 404, as shown at 405, the method includes commanding the three-way CPV (e.g., CPV 158 shown in FIG. 1) into a position that is open to the path between the ejector and intake manifold. In this way, air may flow from the intake passage, upstream of the compressor, through the three-way CPV, and to the intake manifold (downstream of the throttle). At the same time, the flow path of the CPV between the canister and each of the intake manifold and intake passage is blocked such that no purge flow enters the intake system from the canister. In a second embodiment of the method at 404, as shown at 407, the method includes commanding (e.g., via the controlling actuating the CPV solenoids) CPV1 (e.g., CPV1 157 shown in FIG. 2) into a closed position and CPV2 (e.g., CPV2 170 shown in FIG. 2) into an open position. In this way, air may flow from the intake passage, upstream of the compressor, through CPV2, and to the intake manifold (downstream of the throttle). At the same time, by closing CPV1, the flow path between the canister and each of the intake manifold and intake passage is blocked such that no purge flow enters the intake system from the canister.

After moving the valves into the commanded positions at 404, the method continues to 406 and includes estimating and/or measuring the current A/F. As explained above, this may include the controller determining the current A/F based on an output of an oxygen sensor, such as an exhaust gas sensor positioned in an exhaust manifold or passage, downstream of the engine cylinders. The method at 408 includes determining if the A/F, after commanding and moving the CPV(s) at 404, has increased by a threshold amount. Thus, the method at 408 may include determining a change in A/F from before the adjusting the CPV(s) to allow flow between the intake passage and intake manifold, as described above, to after adjusting the CPV(s) and determining if the determined change in A/F is greater than the threshold amount. The threshold amount may be a positive, non-zero value. Additionally, the threshold amount may be based on a change in A/F that is indicative of airflow passing through the flow passage in which the CPV(s) are disposed, from the intake passage to the intake manifold. The threshold amount may be set by the controller as a change in A/F that is detectable by an air-fuel sensor (e.g., oxygen or exhaust gas sensor) and may indicate that there is leakage through the CPV(s) from the intake passage to the intake manifold. If it is determined that the A/F increased by the threshold amount at 408, the method proceeds to 412 to not indicated degradation of the CPV(s) and return the CPV(s) to their base (e.g., closed, as explained above) positions. However, if at 408 it is determined that the A/F did not increase by the threshold amount after adjusting the CPV(s), the method continues to 410 to indicate degradation of the CPV(s). As shown at 414, indicating degradation of the CPV(s) may include and/or result in setting a diagnostic flag in the controller, notifying a vehicle operator (e.g., via an audible or visible signal which indicates the CPV(s) need to be serviced and/or replaced), and/or taking corrective action. Taking corrective action may include adjusting fuel injection (via actuating fuel injectors) and/or adjusting airflow (via actuating a throttle) to the engine cylinders. For example, if the CPV(s) are degraded such that air is flowing from the intake passage to the intake manifold via the CPV(s) (which may be leaking or stuck in a position that allows the flow of air from the intake passage to the intake manifold), the controller may increase fuel injection to compensate for the increased airflow to the engine cylinders. In another example, taking corrective action at 414 may include fluttering or cycling the degraded CPV(s) open and closed (or into different positions) several times and then re-running the diagnostic routine (e.g., method 400) to see if the CPV(s) were successfully unstuck.

FIG. 5 depicts a method 500 for diagnosing one or more valves of the fuel vapor recovery system following a canister purge or valve diagnostic request under vacuum (e.g., non-boosted) conditions. Method 500 continues from the method at 318 of FIG. 3. The method starts at 502 by monitoring and determining a fuel tank pressure (FTP) of a fuel tank coupled to the fuel vapor recovery system (e.g., monitoring an output of a FTPT, such as FTPT 138 shown in FIGS. 1-2) after commanding and adjusting the CPV(s) into positions that allow purge flow from the fuel vapor canister to the intake manifold, as described at 316 in FIG. 3. Thus, the method at 502 may include monitoring fuel tank pressure during a purge event. At 503, the method includes adjusting fueling and/or air flow the engine cylinder based on A/F during the purge event and/or diagnostic routine. For example, the method at 503 may include decreasing fuel injection (via actuating the fuel injectors to inject less fuel) to the engine cylinders to compensate for the fuel vapors being purged to the intake manifold. In some embodiments, the method at 503 may include not adjusting fueling and air flow to the engine cylinders if a diagnostic only is being performed (and not a purge event) since diagnosing the CPV(s) may last for a shorter duration that if a purge event were taking place (as described above with reference to FIG. 3). At 504, the method includes determining whether the fuel tank pressure decreased by a threshold amount during the purging or diagnostic (e.g., after adjusting the valves at 316 in method 300). The fuel tank pressure decreasing by the threshold amount may include the fuel tank pressure decreasing below atmospheric pressure such that there is an increase in vacuum pressure. If the controller determines that the fuel tank pressure has decreased by the threshold amount, valve degradation is not indicated at 508. However, if the fuel tank pressure did not decrease by the threshold amount, the method includes indicating degradation of a check valve positioned in a passage between the intake manifold and the passage containing the one or more CPV(S) (e.g., check valve 153 shown in FIGS. 1-2) at 506. The method then returns to 324 of method 300 shown in FIG. 3.

In FIG. 6, a method 600 for diagnosing one or more valves of the fuel vapor recovery system during a canister purge or valve diagnostic event under boost conditions is illustrated. Method 600 continues from the method at 322 of FIG. 3. At 602, the method starts with monitoring and determining the fuel tank pressure (e.g., monitoring an output of the FTPT, as described above with reference to FIG. 5) after commanding and adjusting the CPV(s) into their commanded positions, as described at 320 in FIG. 3. At 603, the method includes adjusting fueling and/or air flow the engine cylinder based on A/F during the purge event and/or diagnostic routine, similar to as described above for the method at 503 in FIG. 5.

At 604, the method includes determining if the fuel tank pressure (FTP) increased by a threshold (or if the determined fuel tank pressure is greater than a first upper threshold pressure) after the adjusting the position of the CPV(s). If the controller determines that the fuel tank pressure increased by the threshold, then degradation of the check valve positioned in the passage between the intake manifold and the passage containing the one or more CPV(S) (e.g., check valve 153 shown in FIGS. 1-2) may be indicated at 606. Alternatively, if the controller determines that the fuel tank pressure did not increase by the threshold at 604, the method continues to 608 where the method includes determining whether the fuel tank pressure determined after adjusting the CPV(s) is less than a first lower threshold. In one example, the first lower threshold is a pressure amount that is below atmospheric pressure. At 610, if the controller determines at 608 that the fuel tank pressure is less than the first lower threshold, valve degradation is not indicated. However, if the fuel tank pressure is not less than the first lower threshold, the method continues to 612. At 612, the method includes determining whether the fuel tank pressure determined at 602 is between a second upper and second lower threshold. In one example, the second upper threshold may be lower than the first upper threshold and the second lower threshold may be greater than the first lower threshold. If the fuel tank pressure is between the second upper and second lower thresholds, the method continues to 614 to indicate CPV degradation and/or ejector degradation. For example, the three-way CPV may be stuck closed in the path between the canister and ejector or CPV2 may be stuck closed. In another example, the ejector may be degraded. However, if the determined fuel tank pressure is not between the second upper and second lower threshold, the method continues to 610 to not indicate valve degradation in the fuel vapor recovery system.

In this way, the methods presented in FIGS. 3-6 provide for a method for adjusting one or more canister purge valves arranged in a flow passage coupled to a fuel vapor canister, an intake manifold, and an intake passage upstream of a compressor, to allow flow through the flow passage between the intake passage and intake manifold and not to the canister; and indicating the one or more canister purge valves are degraded based on a change in air-fuel ratio following the adjusting. The method may further include adjusting engine operation based on the indicating that the one or more canister purge valves are degraded. In one example, adjusting engine operation includes one or more of increasing fueling to engine cylinders and decreasing air flow to the engine cylinders. In another example, the method may include actuating the one or more canister purge valves to cycle back and forth between one or more valve positions in response to the indicating that the one or more canister purge valves are degraded in order to unstick the one or more canister purge valves. Additionally, the method may include, prior to the adjusting, estimating a baseline air-fuel ratio and following the adjusting, comparing an estimated, current air-fuel ratio to the baseline air-fuel ratio to determine the change in air-fuel ratio following the adjusting. In one example, indicating the one or more canister purge valves are degraded based on the change in air-fuel ratio following the adjusting includes indicating degradation in response to the air-fuel ratio not increasing by a threshold amount from the baseline air-fuel ratio to the current air-fuel ratio. In another example, the method may include not indicating degradation of the one or more canister purge valves and returning the one or more canister purge valves to base positions which block flow through the flow passage between the canister and each of the intake passage and intake manifold in response to the air-fuel ratio increasing by a threshold amount from the baseline air-fuel ratio to the current air-fuel ratio. For example, indicating the one or more canister purge valves are degraded includes one or more of setting a diagnostic flag and notifying a vehicle operator via a visual or audible signal. In a first embodiment of the method, adjusting the one or more canister purge valves to allow flow through the flow passage between the intake passage and intake manifold and not to the canister includes adjusting a single, three-way canister purge valve arranged at a junction between a first passage coupled to the canister, a second passage coupled to the intake manifold, and a third passage coupled to the intake passage into a first position that is open to the intake passage and intake manifold and closed to the canister. In a second embodiment of the method, the method includes adjusting the one or more canister purge valves to allow flow through the flow passage between the intake passage and intake manifold and not to the canister includes adjusting a first canister purge valve arranged in a first passage, between the canister and a junction between the first passage coupled to the canister, a second passage coupled to the intake manifold, and a third passage coupled to the intake passage, into a closed position to block flow from the canister to the junction and adjusting a second canister purge valve arranged in the third passage, between the intake passage and junction, into an open position to allow flow between the intake passage and intake manifold. Additionally, adjusting the one or more canister purge valves to allow flow through the flow passage between the intake passage and intake manifold and not to the canister may be responsive to engine operation at non-boosted conditions when there is not a request to purge vapors from the canister.

Figure 7:
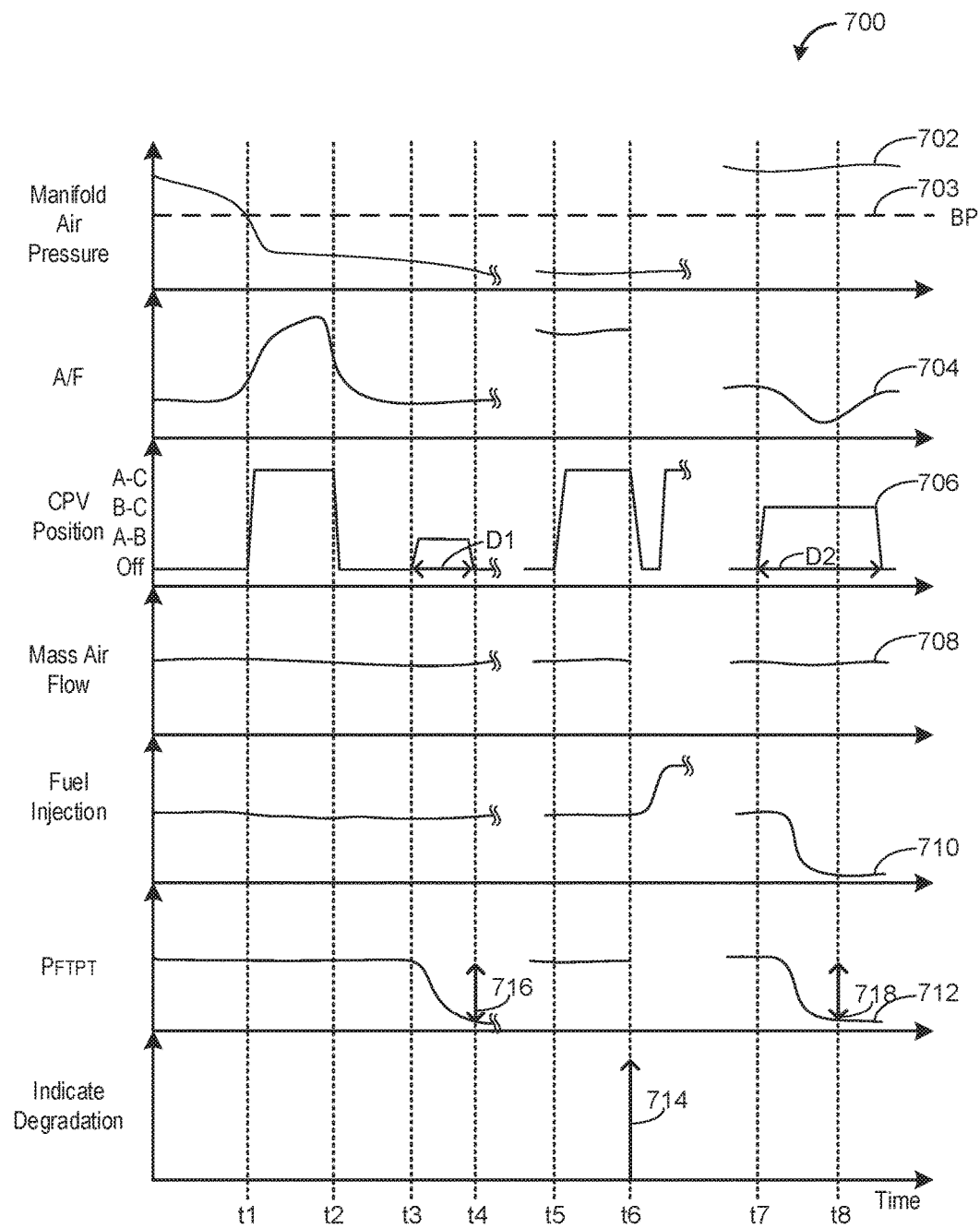
FIG. 7 shows a graph depicting adjustments to various engine operating parameters in response to a condition of a three-way canister purge valve in a first embodiment of a fuel vapor recovery system.
Figure 8:
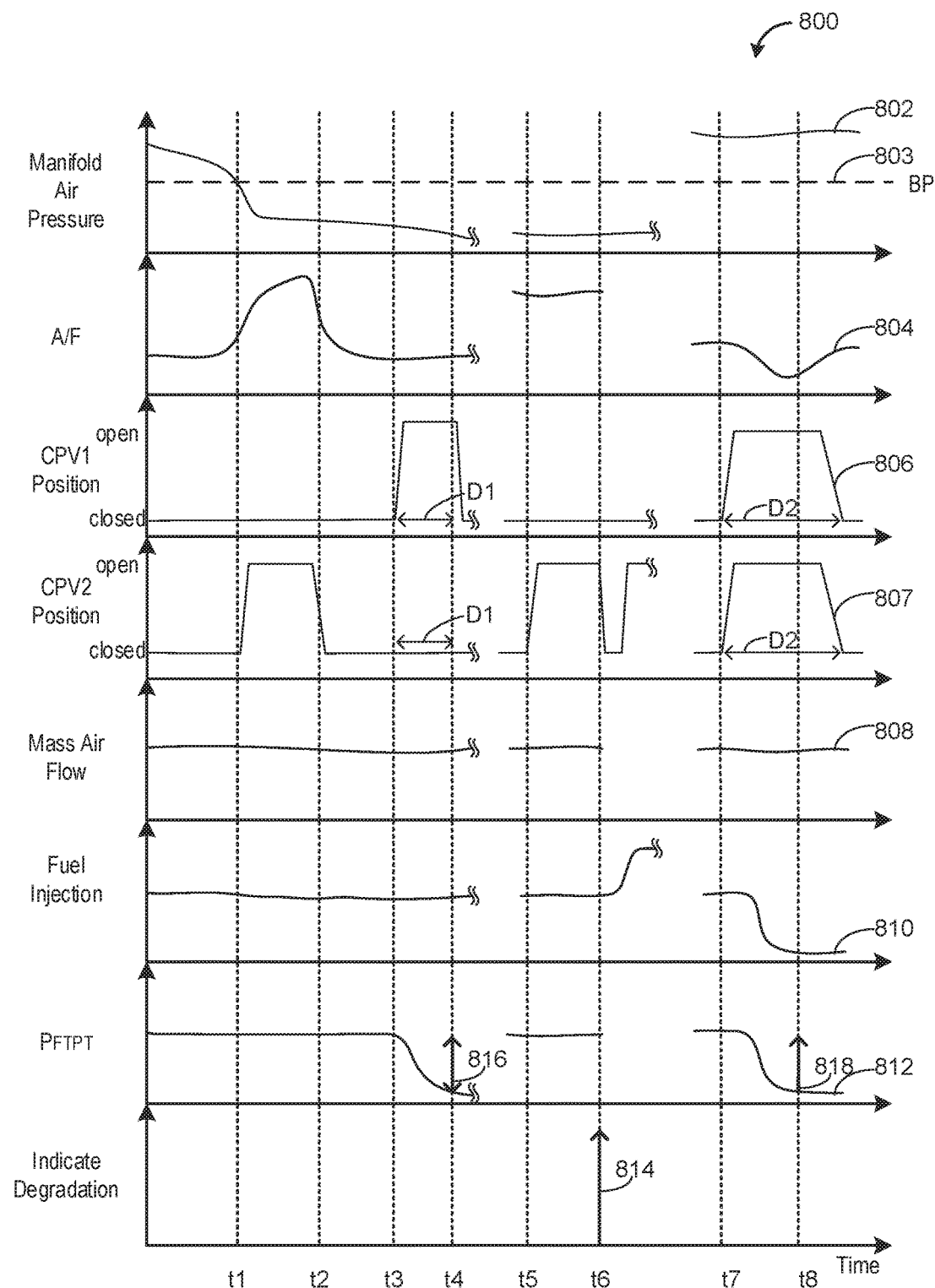
FIG. 8 shows a graph depicting adjustments to various engine operating parameters in response to conditions of a first canister purge valve and a second canister purge valve in a second embodiment of a fuel vapor recovery system.

In FIGS. 7 and 8, graphs 700 and 800 illustrate adjustments to various operating conditions during a canister purge or valve diagnostic under boosted or vacuum conditions. For example, graph 700 illustrates positions of the three-way CPV in the first embodiment of the fuel vapor recovery system (such as three-way CPV 158 shown in FIG. 1) and various engine operating parameters observed during the execution of various fuel vapor recovery system diagnostic and purging routines (such as the methods 300-600 depicted in FIGS. 3-6). In another example, graph 800 illustrates positions of CPV1 (e.g., CPV 1 157 shown in FIG. 2) and CPV2 (e.g., CPV2 170 shown in FIG. 2) in the second embodiment of the fuel vapor recovery system, as well as various engine operating parameters observed during the execution of various fuel vapor recovery system diagnostics and purging routines (such as methods 300-600 of FIGS. 3-6). The operating parameters illustrated in graphs 700 and 800 include intake manifold air pressure (MAP), air-fuel ratio (A/F), mass air flow (MAF), fuel injection (e.g., an amount of fuel injected by the fuel injectors), pressure output by the FTPT ($P_{FTPT}$), CPV valve position, and whether degradation of the CPV(s) is indicated. For each operating parameter, time is depicted along the horizontal axis and values of each respective operating parameter are depicted along the vertical axis.

Turning first to FIG. 7, graph 700 shows changes in MAP at plot 702, barometric pressure (BP) at plot 703, changes in A/F at plot 704, changes in a commanded position of the three-way CPV at plot 706, changes in MAF at plot 708, changes in fuel injection amount at plot 710, changes in $P_{FTPT}$ at plot 712, and indication of CPV degradation at plot 714. When MAP is greater than BP, the engine may be operating under boosted conditions. Additionally, when MAP is less than BP, the engine may be operating under non-boosted, or vacuum, conditions. The commanded CPV position may include the position of the CPV commanded by the controller via sending an actuation signal to corresponding CPV solenoids. There are four commanded positions of the three-way CPV: open to the intake manifold and canister while closed to the intake passage, upstream of the compressor, and ejector (referred to herein as flow path A-B), closed to the intake manifold and open to the canister and ejector (referred to herein as flow path B-C), open to the path between the intake manifold and ejector (referred to herein as path A-C), and a closed or off position.

Prior to time t1, the engine is boosted (e.g. MAP, illustrated in plot 702, is greater than barometric pressure, BP, at plot 703). Additionally, the three-way CPV is in an off position (plot 706) so no air or purge vapors may be passing through or across the valve. At time t1, the engine is no longer boosted and thus MAP decreases below BP (plots 702 and 703). Additionally, there may not be a request for fuel vapor canister purge at time t1. In response to the non-boosted conditions and no request to purge the canister, the controller commands the three-way CPV into the A-C flow path position. After adjusting the three-way valve into the A-C flow path position, air may flow from the intake passage, upstream of the compressor, to the intake manifold. As a result, A/F increases (plot 704), thereby indicating a lean air-fuel condition. In response to A/F increasing after commanding and adjusting the three-way CPV into the A-C flow path position, degradation is not indicated at time t2 (plot 714). Instead, the controller returns the CPV to the off position at t2 (plot 706). Furthermore, since A/F only increases between time t1 and time t2 due to the CPV diagnostic event and degradation is not indicated, fuel injection (plot 710) and MAF (plot 708) are maintained at their requested level (e.g., requested levels for a current torque demand).

At time t3, a request to diagnose the CPV but not purge the canister is received while the engine is not boosted (plots 702 and 703). In response, the controller adjusts the three-way CPV into the A-B flow path position (plot 706). The three-way CPV is maintained in the A-B position for a first duration, D1, which may be a length of time for diagnosing the position of the CPV but not purging fuel vapors. Fuel tank pressure ($P_{FTPT}$) decreases after adjusting the CPV at time t3 by a threshold amount, shown at 716, thereby indicating an increase in vacuum. Because $P_{FTPT}$ decreases by the threshold amount, degradation is not indicated at time t4 and, as a result, the CPV is commanded to an off position at time t4.

At a later time t5 (e.g., after a period of time passes), the engine is not boosted (plots 702 and 703) and there may be no request to purge or diagnose the CPV in the A-B or B-C positions. In another example, the controller may receive a request at time t5 to diagnose the CPV in the A-C position, during non-boosted engine operation. For example, this request may be received after a period of engine cycles, following each engine startup, and/or anytime no fuel vapor purge is requested when the engine is not boosted. In response to a request to diagnose the CPV during un-boosted engine operation, the three-way CPV is commanded open to the A-C position at time t5 (plot 706). After commanding the CPV open to the A-C path, no change in A/F (plot 704) is observed between time t5 and time t6. This may indicate a lean condition. At time t6, in response to the A/F not changing by a threshold amount after commanding the CPV open to the A-C path, degradation is indicated (plot 714). In response to the indication of degradation, the controller increases fuel injection (plot 710) at 710. The controller may also actuate the CPV between one or more positions (plot 706) at time t6 in an attempt to unstick the CPV. Actuating the CPV to unstick the CPV may include fluttering or cycling the valve between different positions (e.g. open and closed or different paths) and then diagnosing the CPV again to determine whether the CPV has been successfully unstuck. The controller may take alternative or additional corrective actions at time t6 in order to compensate for the degraded or stuck CPV.

At a later time t7, the engine is boosted (plots 702 and 703) and there is a request to purge the fuel vapor canister. In response, the controller commands the CPV into the B-C flow path position. The controller maintains the CPV in the B-C position for a second duration, D2, which is a length of time for purging fuel vapors from the fuel vapor canister. As shown in FIG. 7, the D2 is longer than D1 since purging and diagnosing are taking place and not just diagnosing the CPV position (as shown between time t3 and time t4). Between time t7 and t8, the A/F may decrease due to purging fuel vapors from the canister to the intake passage, upstream of the compressor (plot 704). Thus, the controller may decrease fuel injection between time t7 and time t8 to compensate for the increased fuel vapors entering the engine cylinders during the purge event (plot 710). $P_{FTPT}$ decreases by a threshold amount, as shown at 718 (plot 712) and in response, the controller does not indicated valve degradation at time t8.

In this way, FIG. 7 illustrates a method that includes: during non-boosted engine operation when purging of a fuel vapor canister is not requested: adjusting a three-way canister purge valve arranged between the canister, an intake manifold, and an intake passage upstream of a compressor, into a first position that is open to the intake manifold and intake passage and closed to the canister; and indicating the valve is degraded based on a change in air-fuel ratio after the adjusting, as shown at time t6. As shown at time t6, the method may further include adjusting engine operation based on the indicating, where adjusting engine operating includes adjusting fueling to engine cylinders based on the change in air-fuel ratio after the adjusting of the CPV. In one example, indicating the valve is degraded based on the change in air-fuel ratio after the adjusting includes indicating the valve is degraded in response to the air-fuel ratio not increasing by a threshold amount from before the adjusting to after the adjusting, as shown between times t5 and t6, where the threshold amount is a non-zero threshold. In another example, as shown at time t2, the method may include, not indicating the valve is degraded and returning the valve to a base position that is closed to intake manifold and intake passage in response to the air-fuel ratio increasing by the threshold amount from before the adjusting to after the adjusting. As shown at time t7, the method may further include adjusting the canister purge valve into a second position that is open to the intake passage and canister and closed to the intake manifold in response to a request to purge vapors from the canister or diagnose a position of the canister purge valve when the engine is boosted. The method may further include maintaining the canister purge valve in the second position for a first duration and diagnosing a position of the canister purge valve when the request is a request to diagnose the position of the canister purge valve and maintaining the canister purge valve in the second position for a second duration (D2), longer than the first duration, purging fuel vapors from the canister, and diagnosing the position of the canister purge valve when the requires is a request to purge vapors from the canister (as shown at time t7). As shown at time t3, the method may further include adjusting the canister purge valve into a third position that is open to the intake manifold and canister and closed to the intake passage in response to a request to purge vapors from the canister or diagnose a position of the canister purge valve when the engine is not boosted.

FIG. 8, illustrates another graph 800 similar to that of graph 700 in FIG. 7. In FIG. 8, operating conditions and examples are similar to those presented in FIG. 7. However, in this example, adjustments and diagnostics on a two CPV fuel recovery system including CPV1 and CPV2 (such as CPV1 and CPV2 shown in FIG. 2) are shown. Specifically, graph 800 shows changes in MAP at plot 802, barometric pressure (BP) at plot 803, changes in A/F at plot 804, changes in a commanded position of CPV1 at plot 806, changes in a commanded position of CPV2 at plot 807, changes in MAF at plot 808, changes in fuel injection amount at plot 810, changes in $P_{FTPT}$ at plot 812, and indication of fuel recovery system valve degradation at plot 814. As explained above, the commanded CPV1 and CPV2 positions may include the position of the CPV(s) commanded by the controller via sending an actuation signal to corresponding CPV solenoid. The commanded positions of CPV1 include an open position which allows flow from the canister to a position downstream of CPV1 (such as the intake manifold or intake passage) and a closed position that blocks flow from the canister to the position downstream of the CPV1. The commanded positions of CPV2 include an open position which allows flow between the ejector and CPV1 and/or the intake manifold and a closed position that blocks flow between the ejector and CPV1 and/or the intake manifold. Combinations of the open and/or closed positions of CPV1 and CPV2 recreate the positions of the three-way CPV valve: commanding CPV1 open and CPV2 closed allows flow between the canister and intake manifold, commanding both CPV1 and CPV2 open allows flow between the canister and ejector, commanding CPV1 closed and CPV2 open establishes a path between the ejector and intake manifold, and commanding both CPV1 and CPV2 closed blocks flow.

Prior to time t1, the engine is boosted (e.g. MAP, illustrated in plot 802, is greater than barometric pressure, BP, at 803). Additionally, CPV1 (plot 806) and CPV2 (plot 807) are in an off position so no air or purge vapors may be passing through or across the valves. At time t1, the engine is no longer boosted and thus MAP decreases below BP (plots 802 and 803). Additionally, there may not be a request for fuel vapor canister purge at time t1. In response to the non-boosted conditions and no request to purge the canister, the controller commands CPV2 open (plot 806) but maintains CPV1 closed (plot 807). After adjusting CPV1 closed and CPV2 open, air may flow from the intake passage, upstream of the compressor, to the intake manifold. As a result, A/F increases (plot 804), thereby indicating a lean air-fuel condition. In response to A/F increasing after commanding and adjusting the three-way CPV into the A-C flow path position, degradation is not indicated at time t2 (plot 814). Instead, the controller returns both CPV1 and CPV2 to off positions at t2 (plots 806 and 807). Furthermore, since A/F only increases between time t1 and time t2 due to the CPV diagnostic event and degradation is not indicated, fuel injection (plot 810) and MAF (plot 808) are maintained at their requested level (e.g., requested levels for a current torque demand).

At time t3, a request to diagnose the CPV but not purge the canister is received while the engine is not boosted (plots 802 and 803). In response, the controller adjusts CPV1 open while maintaining CPV2 closed (plots 806 and 807). CPV1 is maintained open for a first duration, D1, which may be a length of time for diagnosing the position of CPV1 but not purging fuel vapors. Fuel tank pressure ($P_{FTPT}$) decreases after adjusting CPV1 at time t3 by a threshold amount, shown at 816, thereby indicating an increase in vacuum. Because $P_{FTPT}$ decreases by the threshold amount, degradation is not indicated at time t4 and, as a result, CPV1 is commanded to an off position at time t4.

At a later time t5 (e.g., after a period of time passes), the engine is not boosted (plots 802 and 803) and there may be no request to purge or diagnose the CPVs. In another example, the controller may receive a request at time t5 to diagnose the valves, during non-boosted engine operation. For example, this request may be received after a period of engine cycles, following each engine startup, and/or anytime no fuel vapor purge is requested when the engine is not boosted. In response to a request to diagnose the valves during un-boosted engine operation, CPV2 is commanded open and CPV1 is maintained closed at time t5 (plots 806 and 807). After commanding CPV2 open, no change in A/F (plot 804) is observed between time t5 and time t6. This may indicate a lean condition. At time t6, in response to the A/F not changing by a threshold amount after commanding CPV2 open, degradation is indicated (plot 814). In response to the indication of degradation, the controller increases fuel injection (plot 810). The controller may also actuate CPV2 between one or more positions (plot 807) at time t6 in an attempt to unstick the CPV. Actuating the CPV to unstick the CPV may include fluttering or cycling the valve between different positions (e.g. open and closed or different paths) and then diagnosing the CPV again to determine whether the CPV has been successfully unstuck. The controller may take alternative or additional corrective actions at time t6 in order to compensate for the degraded or stuck CPV.

At a later time t7, the engine is boosted (plots 802 and 803) and there is a request to purge the fuel vapor canister. In response, the controller commands both CPV1 and CPV2 open. The controller maintains the CPVs open for a second duration, D2, which is a length of time for purging fuel vapors from the fuel vapor canister. As shown in FIG. 8, the D2 is longer than D1 since purging and diagnosing are taking place and not just diagnosing the CPV position (as shown between time t3 and time t4). Between time t7 and t8, the A/F may decrease due to purging fuel vapors from the canister to the intake passage, upstream of the compressor (plot 804). Thus, the controller may decrease fuel injection between time t7 and time t8 to compensate for the increased fuel vapors entering the engine cylinders during the purge event (plot 810). $P_{FTPT}$ decreases by a threshold amount, as shown at 818 (plot 812) and in response, the controller does not indicated valve degradation at time t8.

In this way, one or more CPVs in a fuel vapor recovery system may be adjusted to diagnose the CPV(s) or purge a fuel vapor canister in the fuel vapor recovery system under boost or vacuum conditions. As one example, the one or more CPV(s) may be a single, three-way CPV. In another example, the one or more CPV(s) may include a first CPV and second CPV arranged in a flow passage between the fuel vapor canister and intake passage. Undesired airflow from the intake passage to intake manifold resulting from positions of the CPV(s) different than commanded, which may result in lean engine operation, may be indicated and the CPV(s) may be adjusted in response to the indication. By indicating degradation of the CPV(s) and detecting lean conditions, the controller may take corrective action to adjust engine operation. As a result, NOx emissions may be reduced and engine efficiency may be increased. Additionally, by utilizing the one or more CPVs to purge the canister and indicate degradation, the controller may diagnose the position or functioning of the CPV(s) without the use of additional sensors. As such, engine costs and control complexity may be decreased. The technical effect of adjusting one or more CPV(s) to allow flow through the flow passage in which the CPV(s) are disposed, between the intake passage and intake manifold, and not to the fuel vapor canister is to detect valve degradation, such as the one or more CPV(s) stuck in a position that allows unrequested airflow (e.g., unrequested for a desired air-fuel ratio) from the intake passage to intake manifold via the CPV(s). As a result of the detecting valve degradation of the one or more CPVs, an engine controller may adjust engine operation to account for the increase in unrequested airflow that may cause lean combustion conditions. The technical effect of adjusting engine operation based on the indicated degradation of the CPV(s) is to increase engine efficiency and decrease emissions while the CPV(s) is degraded and/or stuck in an unrequested position.

As one embodiment, a method includes adjusting one or more canister purge valves arranged in a flow passage coupled to a fuel vapor canister, an intake manifold, and an intake passage upstream of a compressor, to allow flow through the flow passage between the intake passage and intake manifold and not to the canister; and indicating the one or more canister purge valves are degraded based on a change in air-fuel ratio following the adjusting. In a first example of the method, the method further comprises adjusting engine operation based on the indicating that the one or more canister purge valves are degraded. A second example of the method optionally includes the first example, and further comprises adjusting engine operation based on indicating that the one or more canister purge valves are degraded. A third example of the method optionally includes one or more of the first two examples, and further includes wherein adjusting engine operation, including one or more of increasing fueling to engine cylinders and decreasing air flow to the engine cylinders. A fourth example of the method optionally includes the first through third examples, and further comprises actuating the one or more canister purge valves to cycle back and forth between one or more valve positions in response to the indicating that the one or more canister purge valves are degraded in order to unstick the one or more canister purge valves. A fifth example of the method optionally includes the first through fourth examples, and further comprises prior to the adjusting, estimating a baseline air-fuel ratio and following the adjusting, comparing an estimated, current air-fuel ratio to the baseline air-fuel ratio to determine the change in air-fuel ratio following the adjusting. A sixth example of the method optionally includes the first through fifth examples, and further includes wherein the indicating the one or more canister purge valves are degraded based on the change in air-fuel ratio following the adjusting includes indicating degradation in response to the air-fuel ratio not increasing by a threshold amount from the baseline air-fuel ratio to the current air-fuel ratio. A seventh example of the method optionally includes the first through sixth examples, and further comprises not indicating degradation of the one or more canister purge valves and returning the one or more canister purge valves to base positions which block flow through the flow passage between the canister and each of the intake passage and intake manifold in response to the air-fuel ratio increasing by a threshold amount from the baseline air-fuel ratio to the current air-fuel ratio. An eighth example of the method optionally includes the first through seventh examples, and further includes wherein indicating the one or more canister purge valves are degraded includes one or more of setting a diagnostic flag and notifying a vehicle operator via a visual or audible signal. A ninth example of the method optionally includes the first through eighth examples, and further includes wherein adjusting the one or more canister purge valves to allow flow through the flow passage between the intake passage and intake manifold and not to the canister includes adjusting a single, three-way canister purge valve arranged at a junction between a first passage coupled to the canister, a second passage coupled to the intake manifold, and a third passage coupled to the intake passage into a first position that is open to the intake passage and intake manifold and closed to the canister. A tenth example of the method optionally includes the first through ninth examples, and further includes wherein adjusting the one or more canister purge valves to allow flow through the flow passage between the intake passage and intake manifold and not to the canister includes adjusting a first canister purge valve arranged in a first passage, between the canister and a junction between the first passage coupled to the canister, a second passage coupled to the intake manifold, and a third passage coupled to the intake passage, into a closed position to block flow from the canister to the junction and adjusting a second canister purge valve arranged in the third passage, between the intake passage and junction, into an open position to allow flow between the intake passage and intake manifold. An eleventh example of the method optionally includes the first through tenth examples, and further includes wherein adjusting the one or more canister purge valves to allow flow through the flow passage between the intake passage and intake manifold and not to the canister is responsive to engine operation at non-boosted conditions when there is not a request to purge vapors from the canister.

As another embodiment, a method comprises during non-boosted engine operation when purging of a fuel vapor canister is not requested: adjusting a three-way canister purge valve arranged between the canister, an intake manifold, and an intake passage upstream of a compressor, into a first position that is open to the intake manifold and intake passage and closed to the canister; and indicating the valve is degraded based on a change in air-fuel ratio after the adjusting. In a first example of the method, the method further comprises adjusting engine operation based on the indicating, where adjusting engine operating includes one or more of adjusting fueling and airflow to engine cylinders based on the change in air-fuel ratio after the adjusting. A second example of the method optionally includes the first example, and further includes wherein indicating the valve is degraded based on the change in air-fuel ratio after the adjusting includes indicating the valve is degraded in response to the air-fuel ratio not increasing by a threshold amount from before the adjusting to after the adjusting, where the threshold amount is a non-zero threshold. A third example of the method optionally includes the first two examples, and further includes not indicating the valve is degraded and returning the valve to a base position that is closed to intake manifold and intake passage in response to the air-fuel ratio increasing by the threshold amount from before the adjusting to after the adjusting. A fourth example of the method optionally includes the first through third examples, and further comprises adjusting the canister purge valve into a second position that is open to the intake passage and canister and closed to the intake manifold in response to a request to purge vapors from the canister or diagnose a position of the canister purge valve when the engine is boosted. A fifth example of the method optionally includes the first through fourth examples, and further comprises maintaining the canister purge valve in the second position for a first duration and diagnosing a position of the canister purge valve when the request is a request to diagnose the position of the canister purge valve and maintaining the canister purge valve in the second position for a second duration, longer than the first duration, purging fuel vapors from the canister, and diagnosing the position of the canister purge valve when the requires is a request to purge vapors from the canister. A sixth example of the method optionally includes the first through fifth examples, and further comprises adjusting the canister purge valve into a third position that is open to the intake manifold and canister and closed to the intake passage in response to a request to purge vapors from the canister or diagnose a position of the canister purge valve when the engine is not boosted.

As yet another embodiment, a system includes an intake manifold coupled to a plurality of engine cylinders; a turbocharger including a turbine-driven compressor arranged in an intake passage upstream of the intake manifold; a fuel vapor canister coupled to a fuel tank and fuel vapor purge passage; a three-way canister purge valve arranged in the fuel vapor purge passage and fluidly coupled to each of the fuel vapor canister, the intake manifold, and the intake passage upstream of the compressor; and a controller including memory with computer readable instructions for: adjusting the three-way canister purge valve into a first position that is open to the intake manifold and intake passage and closed to the canister; and indicating degradation of the three-way canister purge valve in response to an air-fuel ratio not changing by a threshold amount following the adjusting. In a first example of the system, the system further comprises an ejector arranged between the three-way canister purge valve and the intake passage and a check valve arranged between three-way canister purge valve and the intake manifold, and wherein the computer readable instructions further comprise instructions for increasing fueling to the plurality of engine cylinders in response to the indicating.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method, comprising:
adjusting one or more canister purge valves arranged in a flow passage coupled to a fuel vapor canister, an intake manifold, and an intake passage upstream of a compressor, to allow flow through the flow passage between the intake passage and intake manifold and not to the canister; and
indicating the one or more canister purge valves are degraded based on a change in air-fuel ratio following the adjusting.

2. The method of claim 1, further comprising adjusting engine operation based on the indicating that the one or more canister purge valves are degraded.

3. The method of claim 2, wherein adjusting engine operation includes one or more of increasing fueling to engine cylinders and decreasing air flow to the engine cylinders.

4. The method of claim 1, further comprising actuating the one or more canister purge valves to cycle back and forth between one or more valve positions in response to the indicating that the one or more canister purge valves are degraded in order to unstick the one or more canister purge valves.

5. The method of claim 1, further comprising, prior to the adjusting, estimating a baseline air-fuel ratio, and following the adjusting, comparing an estimated, current air-fuel ratio to the baseline air-fuel ratio to determine the change in air-fuel ratio following the adjusting.

6. The method of claim 5, wherein the indicating the one or more canister purge valves are degraded based on the change in air-fuel ratio following the adjusting includes indicating degradation in response to the air-fuel ratio not increasing by a threshold amount from the baseline air-fuel ratio to the current air-fuel ratio.

7. The method of claim 5, further comprising not indicating degradation of the one or more canister purge valves and returning the one or more canister purge valves to base positions which block flow through the flow passage between the canister and each of the intake passage and intake manifold in response to the air-fuel ratio increasing by a threshold amount from the baseline air-fuel ratio to the current air-fuel ratio.

8. The method of claim 1, wherein indicating the one or more canister purge valves are degraded includes one or more of setting a diagnostic flag and notifying a vehicle operator via a visual or audible signal.

9. The method of claim 1, wherein adjusting the one or more canister purge valves to allow flow through the flow passage between the intake passage and intake manifold and not to the canister includes adjusting a single, three-way canister purge valve arranged at a junction between a first passage coupled to the canister, a second passage coupled to the intake manifold, and a third passage coupled to the intake passage into a first position that is open to the intake passage and intake manifold and closed to the canister.

10. The method of claim 1, wherein adjusting the one or more canister purge valves to allow flow through the flow passage between the intake passage and intake manifold and not to the canister includes adjusting a first canister purge valve arranged in a first passage, between the canister and a junction between the first passage coupled to the canister, a second passage coupled to the intake manifold, and a third passage coupled to the intake passage, into a closed position to block flow from the canister to the junction and adjusting a second canister purge valve arranged in the third passage, between the intake passage and junction, into an open position to allow flow between the intake passage and intake manifold.

11. The method of claim 1, wherein adjusting the one or more canister purge valves to allow flow through the flow passage between the intake passage and intake manifold and not to the canister is responsive to engine operation at non-boosted conditions when there is not a request to purge vapors from the canister.

12. A method, comprising:
during non-boosted engine operation when purging of a fuel vapor canister is not requested:
adjusting a three-way canister purge valve arranged between the canister, an intake manifold, and an intake passage upstream of a compressor, into a first position that is open to the intake manifold and intake passage and closed to the canister; and
indicating the valve is degraded based on a change in air-fuel ratio after the adjusting.

13. The method of claim 12, further comprising adjusting engine operation based on the indicating, where adjusting engine operating includes one or more of adjusting fueling and airflow to engine cylinders based on the change in air-fuel ratio after the adjusting.

14. The method of claim 12, wherein indicating the valve is degraded based on the change in air-fuel ratio after the adjusting includes indicating the valve is degraded in response to the air-fuel ratio not increasing by a threshold amount from before the adjusting to after the adjusting, where the threshold amount is a non-zero threshold.

15. The method of claim 14, further comprising not indicating the valve is degraded and returning the valve to a base position that is closed to the intake manifold and the intake passage in response to the air-fuel ratio increasing by the threshold amount from before the adjusting to after the adjusting.

16. The method of claim 12, further comprising adjusting the canister purge valve into a second position that is open to the intake passage and canister and closed to the intake manifold in response to a request to purge vapors from the canister or diagnose a position of the canister purge valve when the engine is boosted.

17. The method of claim 16, further comprising maintaining the canister purge valve in the second position for a first duration and diagnosing a position of the canister purge valve when the request is a request to diagnose the position of the canister purge valve and maintaining the canister purge valve in the second position for a second duration, longer than the first duration, purging fuel vapors from the canister, and diagnosing the position of the canister purge valve when the request is a request to purge vapors from the canister.

18. The method of claim 12, further comprising adjusting the canister purge valve into a third position that is open to the intake manifold and canister and closed to the intake passage in response to a request to purge vapors from the canister or diagnose a position of the canister purge valve when the engine is not boosted.

19. A system, comprising:
an intake manifold coupled to a plurality of engine cylinders;
a turbocharger including a turbine-driven compressor arranged in an intake passage upstream of the intake manifold;
a fuel vapor canister coupled to a fuel tank and a fuel vapor purge passage;
a three-way canister purge valve arranged in the fuel vapor purge passage and fluidly coupled to each of the fuel vapor canister, the intake manifold, and the intake passage upstream of the compressor; and
a controller including memory with computer readable instructions for:
adjusting the three-way canister purge valve into a first position that is open to the intake manifold and intake passage and closed to the canister; and
indicating degradation of the three-way canister purge valve in response to an air-fuel ratio not changing by a threshold amount following the adjusting.

20. The system of claim 19, further comprising an ejector arranged between the three-way canister purge valve and the intake passage and a check valve arranged between the three-way canister purge valve and the intake manifold, and wherein the computer readable instructions further comprise instructions for increasing fueling to the plurality of engine cylinders in response to the indicating.

* * * * *